United States Patent [19]

Yamaguchi et al.

[11] Patent Number: 5,335,081
[45] Date of Patent: Aug. 2, 1994

[54] MULTIPLE DISPLAY PRESENTATION SYSTEM CAPABLE OF SEQUENCING PRERECORDED SCENES FOR JOINT REPRODUCTION

[75] Inventors: Hirohisa Yamaguchi; Yasuji Morioka, both of Tokyo, Japan

[73] Assignee: TEAC Corporation, Tokyo, Japan

[21] Appl. No.: 135,855

[22] Filed: Oct. 13, 1993

Related U.S. Application Data

[63] Continuation of Ser. No. 749,140, Aug. 23, 1991, abandoned.

[30] Foreign Application Priority Data

Aug. 24, 1990 [JP] Japan .................................. 2-223947

[51] Int. Cl.$^5$ .................................................. H04N 5/781
[52] U.S. Cl. ................................................ 358/342; 358/335
[58] Field of Search ............... 358/335, 342, 341, 343, 358/311; 360/14.1, 13, 15, 14.3; 348/36, 38; H04N 5/781

[56] References Cited

U.S. PATENT DOCUMENTS

| | | | |
|---|---|---|---|
| 4,777,537 | 10/1988 | Ueno et al. ............................ | 358/342 |
| 4,873,584 | 10/1989 | Hashimoto ............................ | 358/335 |
| 4,905,094 | 2/1990 | Pocock et al. ........................ | 358/335 |
| 4,949,187 | 8/1990 | Cohen .................................. | 358/335 |
| 4,964,004 | 10/1990 | Barker .................................. | 358/335 |

*Primary Examiner*—Tommy P. Chin
*Assistant Examiner*—Huy Nguyen
*Attorney, Agent, or Firm*—Woodcock Washburn Kurtz Mackiewicz & Norris

[57] ABSTRACT

A set of displays are juxtaposed for jointly reproducing, either in still or in continuous motion, successive sets of correlated scenes according to a desired, and readily modifiable, presentation program. The correlated scenes to be reproduced by the displays are retrieved by video disk players from a set of video disks each having a multiplicity of individually addressable record tracks. A system controller is provided which has a rewritable memory for storing a presentation program including the addresses of desired record tracks on each video disks from which the prerecorded scenes are to be retrieved by one associated disk player in a desired sequence, and playback commands indicative of whether the prerecorded scenes on the desired record tracks are to be reproduced in still or in continuous motion. The system controller reads the presentation program on the memory for controlling the disk players according to the presentation program, causing each disk player to retrieve the prerecorded scenes from the desired record tracks on one associated video disk in the desired sequence, for reproduction on one of the displays either in still or in continuous motion as dictated by the presentation program. The presentation program is therefore readily modifiable by rewriting on the memory.

5 Claims, 2 Drawing Sheets

MULTIPLE DISPLAY PRESENTATION SYSTEM CAPABLE OF SEQUENCING PRERECORDED SCENES FOR JOINT REPRODUCTION

This is a continuation of application Ser. No. 07/749,140, filed Aug. 23, 1991, now abandoned.

BACKGROUND OF THE INVENTION

Our invention relates to a visual presentation system having a set of display devices for concurrent reproduction of correlated visual images prerecorded on record media such as video disks. More particularly, our invention pertains to a method and means in such a multiple display presentation system for sequence control of prerecorded scenes for joint reproduction on the displays according to a desired presentation program. The visual presentation system according to our invention lends itself to use for the commercial publicity of new products and processes, the introduction of business corporations and other institutes, the disclosure of scientific and technological theories and findings, and a variety of other presentations addressed to limited audiences.

We know that the idea of juxtaposing a set of, three for example, displays for the simultaneous reproduction of as many correlated video signals is itself not new. Conventionally, the set of displays of the familiar cathode ray tube construction were connected one to each video tape recorder or deck. Loaded with prerecorded magnetic tapes each packaged in a reel to reel envelope such as a cassette or cartridge, the video tape decks were driven synchronously under the direction of an electronic control device. The magnetic tapes had correlated video signals prerecorded thereon. Therefore, as the tape decks were driven synchronously, the correlated video signals were visually reproduced on the displays.

We object to such prior art multiple display presentation systems for more reasons than one. First, the recording of correlated video signals on several magnetic tapes was a very difficult task. It involved complex editing operations, making the recording task even more difficult, costly and time consuming. Furthermore, once the recordings and editings were completed, no change in the sequence of presentation was possible. The slightest change necessitated the rerecording or reediting of the tapes.

SUMMARY OF THE INVENTION

We have hereby invented how to make possible the easy sequencing and resequencing of prerecorded scenes for joint reproduction on a set of displays in juxtaposition, thereby imparting greater utility and versatility to multiple display presentation systems of the kind under consideration.

Briefly stated in one aspect thereof, our invention concerns a method for sequence control of sets of correlated scenes to be retrieved by a plurality of playback devices from associated record media for successive reproduction on a plurality of juxtaposed displays according to a desired presentation program. Each record medium has a multiplicity of record tracks on which the scenes are prerecorded along with addresses individually identifying the record tracks. The method dictates, first of all, the writing of the presentation program on a memory. The presentation program should include at least the addresses of desired record tracks on each record medium from which the prerecorded scenes are to be retrieved by one associated playback device in a desired sequence. If the prerecorded scenes are to be reproduced either in still or in continuous motion, then the presentation program should also include playback commands indicative of whether the prerecorded scenes on the desired record tracks are to be reproduced in still or in continuous motion. Then the control devices are to be controlled according to the presentation program being read out from the memory, causing each playback device to retrieve the prerecorded scenes from the desired record tracks on one associated record medium in the desired sequence, for reproduction on the displays either in still or in continuous motion as dictated by the presentation program.

Preferably, the record media for use in the practice of the method of our invention take the form of optical video disks each having a multiplicity of individually addressable record tracks. Video signals are prerecorded on the disks at a rate of one frame per track. It will be seen that the correlated scenes to be concurrently reproduced on the set of displays need not be prerecorded in synchronism on the video disks. Any record tracks on the video disks are selectable for joint reproduction on the displays. What is more important, the presentation program on the memory is readily rewritable for the reproduction of the prerecorded scenes according to a different presentation program.

Stated in another aspect thereof, our invention is directed to the visual presentation system itself which is capable of visually presenting successive sets of correlated scenes according to the method summarized above. The presentation system comprises a plurality of displays connected to as many playback devices such as optical video disk players for joint reproduction of successive sets of prerecorded scenes retrieved by the playback devices from associated record media such as video disks. Also included is a system controller connected to the playback devices and having a rewritable memory on which a desired presentation program is to be written. Reading the presentation program on the memory, the system controller controls the playback devices accordingly, causing each playback device to retrieve the prerecorded scenes from desired record tracks on one associated record medium in a desired sequence.

We suggest the use of a personal computer, complete with a monitor display and an input keyboard, as the system controller. The presentation program written on the memory can then be visually exhibited on the monitor display. Looking at the displayed presentation program, the operator may modify or rewrite it by manipulating the keyboard.

In order to further enhance the utility and versatility of the multiple display presentation system, and its appeal to the audience, a switching system may be employed whereby each playback device is connectable to any of the displays. We recommend that the switching system be also controlled by the system controller according to the presentation program stored on the memory. The presentation program in this case may include source commands indicative of desired connections between the playback devices and the displays for each set of scenes to be reproduced on the displays.

The presentation program may also include data representative of a desired moment of change from one set of scenes reproduced on the displays to the next. Such moments of scene change may be determined on the basis of either time or the addresses of the record tracks on one of the record media. Embodiments representing both schemes will be disclosed.

The above and other features and advantages of our invention and the manner of realizing them will become more apparent, and the invention itself will best be understood, from a study of the following description and appended claims, with reference had to the attached drawings showing the preferred embodiments of our invention.

DESCRIPTION OF THE PREFERRED EMBODIMENTS

Figure 1:
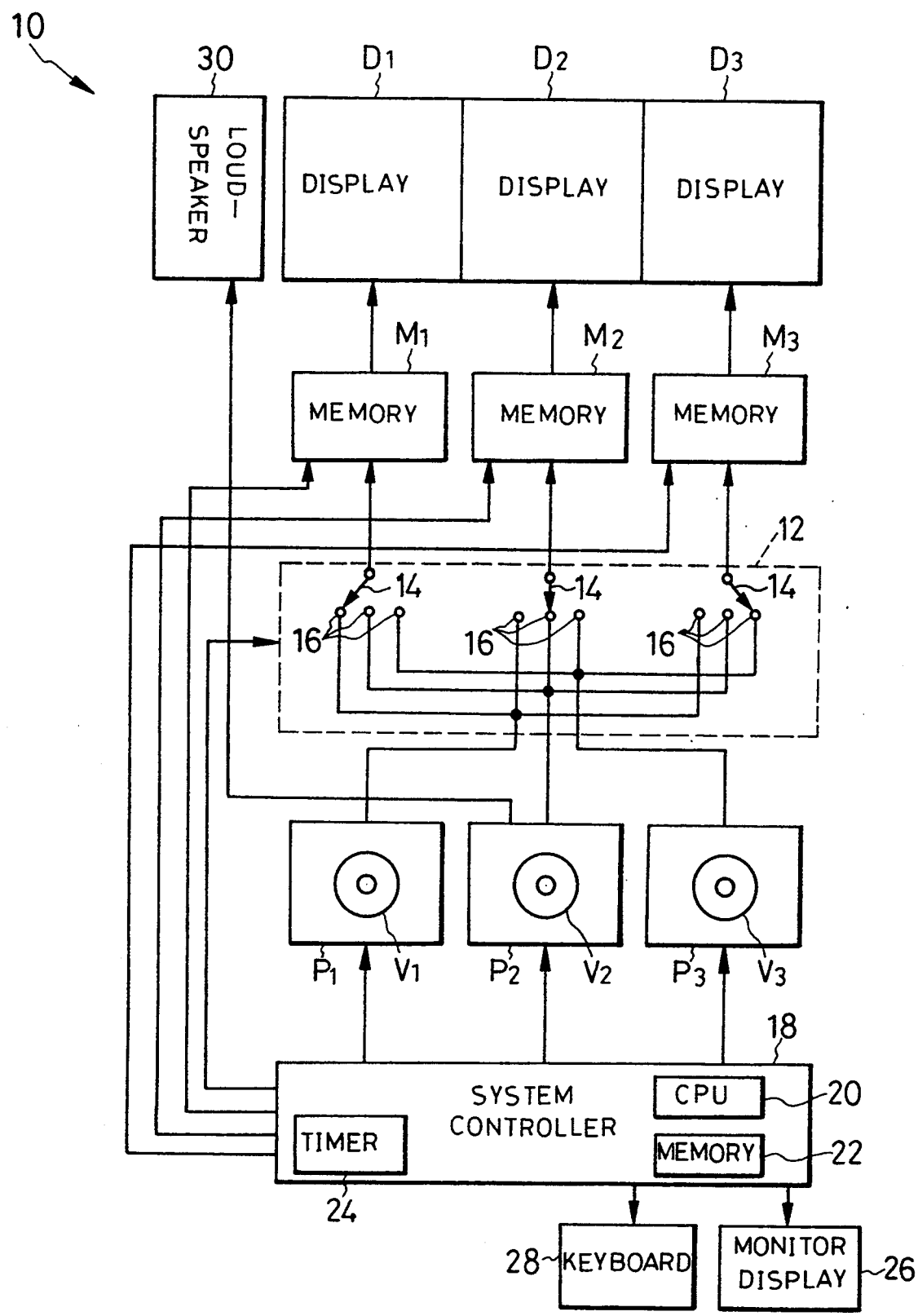
FIG. 1 is a block diagram of a triple display audiovisual presentation system constructed in accordance with the novel concepts of our invention.

We will now describe our invention in detail as embodied in the triple display audiovisual presentation system illustrated in FIG. 1 and therein generally designated 10. The representative presentation system 10 has three displays $D_1$, $D_2$ and $D_3$ in juxtaposition. The displays $D_1$–$D_3$ may be of the familiar cathode ray tube construction or of any other known or suitable design capable of visually reproducing video signals. The correlated video signals to be simultaneously reproduced by the three displays $D_1$–$D_3$ are supplied from three optical video disk players $P_1$, $P_2$ and $P_3$. These disk players are shown together with prerecorded video disks $V_1$, $V_2$ and $V_3$ replaceably loaded therein.

The optical video disk players $P_1$–$P_3$ with the associated video disks $V_1$–$V_3$ can also be of standard construction. Thus each video disk has a record track in the form of a multiturn spiral. A video signal is prerecorded on this spiral track by the National Television System Committee format with a frame repetition rate of one per track turn. We may consider for convenience that each turn of the spiral constitutes one track, so that there are as many substantially annular tracks as there are the turns of the spiral. We may therefore speak of each track as having one frame of the video signal prerecorded thereon. It will therefore be apparent that the record tracks may be arranged in the form of a series of concentric annular tracks, instead of a single multiturn spiral, on each video disk.

We also understand that each video disk has prerecorded thereon a series of addresses in the form of coded serial numbers uniquely identifying the substantially annular track thereon and, therefore, the frames of the prerecorded video signal, in accordance with standard practice in the art. Normally, the addresses are written on the vertical retrace blanking zones of the tracks. The disk players $P_1$–$P_3$ have each an optical pickup assembly, not shown, accessible to any desired one of the addressed tracks for tracing it. The prerecorded picture information on the disk is translated into an equivalent electric signal as the unshown pickup assembly scans the tracks.

As is also well known in the video disk art, the prerecorded picture information on the video disks $V_1$–$V_3$ may be reproduced either in still or in continuous motion. For still reproduction of any one frame or track on any of the disks $V_1$–$V_3$, this track may be scanned repetitively. Continuous motion reproduction results by successively scanning a series of tracks on each disk.

The three video disk players $P_1$–$P_3$ are connected via a switching system 12 to three memories $M_1$, $M_2$ and $M_3$ which in turn are connected respectively to the displays $D_1$–$D_3$. Therefore, the video signals retrieved from the disks $V_1$–$V_3$ are first written on the memories $M_1$–$M_3$ and subsequently read out therefrom for reproduction on the displays $D_1$–$D_3$.

We understand that the switching system 12 comprises electrically actuable selector switches herein shown as conventional multicontact switches, each having a movable contact 14 capable of selective engagement with three fixed contacts 16. The three movable contacts 14 are connected one to each of the memories $M_1$–$M_3$, and the three fixed contacts 16 one to each of the video disk players $P_1$–$P_3$ can be sent to any of the displays $D_1$–$D_3$ via the associated one of the memories $M_1$–$M_3$.

The memories $M_1$–$M_3$ can be of conventional design capable of storing digital video signals from optical video disks. However, it must be taken into consideration that video disk players standard make put out analog video signals, and cathode ray tube displays of standard make accept only analog video signals. We therefore understand that the memories $M_1$–$M_3$ have each an analog to digital converter on its input stage and a digital to analog converter on its output stage. Such memories are commercially available as "frame memories".

The memories $M_1$–$M_3$ can be utilized for still reproduction of scenes retrieved from the video disks $V_1$–$V_3$. To this end, instead of repetitively scanning the same track on any of the disks, the desired frame that has been retrieved from this track and stored on any of the memories $M_1$–$M_3$ may be repetitively read out therefrom for reproduction on the associated one of the displays $D_1$–$D_3$. For additional functions of the memories $M_1$–$M_3$, reference may be had to the U.S. patent application Ser. No. 681,110 filed Apr. 5, 1991, by Yamaguchi et al. under the title of "Visual Presentation System Providing for a Wiping Change from One Scene to Another" and assigned to the assignee of the instant application.

The multiple display presentation system 10 further comprises a system controller 18. In practice the system controller 18 can take the form of a personal computer comprising a central processor unit 20, a rewritable memory 22, and a timer 24. The rewritable memory 22 stores a presentation program to be detailed subsequently. The timer 24 provides time signals representative of time in hours, minutes and seconds. In this particular embodiment of our invention the time signals are utilized by the system controller 18 for reading out the presentation program on the memory 22 and are essential for the execution of the presentation program, as will become apparent as the description proceeds.

The system controller 18 is connected to all of the video disk players $P_1$–$P_3$, the switching system 12 and the memories $M_1$–$M_3$ for controlling their operations in accordance with the presentation program on the memory 22. We understand that the system controller 18 additionally comprises a master synchronizer, not shown, for timing the operations of the three video disk players $P_1$–$P_3$ and the three cathode ray tube displays $D_1$–$D_3$.

A monitor display 26 and a keyboard 28 are conventionally connected to the system controller 18. The monitor display 26 visually displays the presentation program stored on the memory 22. The keyboard 28 serves as input means for use in, as far as out invention is concerned, modifying the presentation program on the memory 22.

Preferably, one of the three video disks $V_1$-$V_3$, herein shown as the disk $V_2$ which is intended for continuous or sequential reproduction of the prerecorded scenes, has a sound signal prerecorded thereon along with the video signal. The sound signal may represent music and a narrative concerning the prerecorded scenes on the disk $V_2$ and, where appropriate, on the other disks $V_1$ and $V_3$, in order to make the presentation more appealing to the audience. For the reproduction of this sound signal, the second disk player $P_2$ is connected to a loudspeaker 30 or a system of loudspeakers. The loudspeaker 30 is shown disposed on one side of the row of displays $D_1$-$D_3$.

Operation

We will refer to Tables 1 and 2 for the discussion of the operation of the multiple display presentation system 10 of the foregoing configuration. These tables show in combination how the prerecorded scenes on the three video disks $V_1$-$V_3$ are selectively reproduced on the three displays $D_1$-$D_3$ in accordance with an example of presentation program that has been introduced into the rewritable memory 22 of the system controller 18. The tables represent, however, only the first six steps of the presentation program as we believe that they suffice for the full disclosure of system operation. By the term "step" we mean a set of correlated scenes reproduced, either in still or in continuous motion, on the displays $D_1$-$D_3$. Thus, as the presentation program proceeds from one step to the next, the reproduced scenes on the displays change from one set to another.

presentation program at the moments indicated Table 1. We also understand that a decoder, not shown, is connected to the timer 24 for generating a Step No. signal in response to the time signals supplied from the timer. For example, the Step No. signal indicates Step No. 0 when the time signals indicate 00 hour, 00 minute and 00 second, Step No. 1 when the time signals indicate 00 hour, 00 minute and 10 seconds, and so forth.

The columns labeled "Command" under "Player $P_1$", "Player $P_2$" and "Player $P_3$" in Table 1 represent playback commands given to the disk players $P_1$, $P_2$ and $P_3$, respectively. There are the following three playback commands in this particular embodiment:

BA=search for the designated address and scan that frame for still reproduction.

NF=normal forward (successively scan frames to the designated final address for continuous motion reproduction).

SF=step forward (move one track from the current address to the next and scan that frame for still reproduction).

In Step No. 0, for example, the player $P_2$ is given the playback command BA to search for Address 30000 and scan that frame for still reproduction. Then, in Step No. 1, the player $P_2$ is given the playback command NF to successively scan the subsequent frames to Address 42000 for continuous motion reproduction. In Step No. 2 the player $P_3$ is given the playback command SF to step one track forward from Address 2000 to Address 2001 and scan this latter frame for still reproduction. The "Address" spaces associated with the playback command SF are left blank because no address designation is necessary for this command.

The complete presentation program of Table 1 is stored as aforesaid on the rewritable memory 22 of the system controller 18. At the starting moment of each step indicated in Table 1 the noted decoder connected

TABLE 1

| Step No. | Time | | | | Presentation Program | | | | | |
|---|---|---|---|---|---|---|---|---|---|---|
| | | | | | Player $P_1$ | | Player $P_2$ | | Player $P_3$ | |
| | Hr | Min | Sec | Fr | Command | Address | Command | Address | Command | Address |
| 0 | 00 | 00 | 00 | 00 | BA | 100 | BA | 30000 | BA | 1000 |
| 1 | 00 | 00 | 10 | | BA | 200 | NF | 42000 | BA | 2000 |
| 2 | 00 | 00 | 40 | | | | | | SF | |
| 3 | 00 | 01 | 10 | | SF | | | | BA | 2000 |
| 4 | 00 | 01 | 40 | | BA | 1000 | | | BA | 3000 |
| 5 | 00 | 01 | 50 | | NF | 10000 | | | NF | 12000 |

With reference first to Table 1 the columns designated "Hr", "Min", "Sec" and "Fr" under "Time" represent, in hours, minutes, seconds and, possibly, frames, the moments of time when the successive steps of the presentation program are started, that is, when the displays $D_1$-$D_3$ start reproducing the successive sets of correlated scenes. Thus, for example, Step No. 1 starts ten seconds after commencement of Step No. 0, Step No. 2 thirty seconds after commencement of Step No. 1, and so forth.

It is the timer 24 built into the system controller 18 that provides the time signals needed by the system controller for reading out the successive steps of the to the timer 24 puts out the Step No. signal representative of the current Step No. in response to the time signals from the timer. Thus knowing the current Step No. at the exact moment specified, the system controller reads out the set of playback commands and associated address designations of that step from the memory 22 and controls the disk players $P_1$-$P_2$ accordingly.

Further the system controller 18 is conventionally enabled to exhibit the presentation program on the monitor display 26. The operator is free to manipulate the keyboard 28 for modifying the playback commands and/or the address designations of any of the steps of the presentation program.

TABLE 2

| Step No. | Source Commands and Reproduced Scenes | | | | | |
|---|---|---|---|---|---|---|
| | Display $D_1$ | | Display $D_2$ | | Display $D_3$ | |
| | Source | Scene | Source | Scene | Source | Scene |
| 0 | $P_1$ | Matterhorn | $P_2$ | Matterhorn | $P_3$ | Matterhorn |
| 1 | $P_1$ | Skis | $P_2$ | Downhill Racing | $P_3$ | Ski Boots |

TABLE 2-continued

| | Source Commands and Reproduced Scenes | | | | | |
|---|---|---|---|---|---|---|
| Step | Display $D_1$ | | Display $D_2$ | | Display $D_3$ | |
| No. | Source | Scene | Source | Scene | Source | Scene |
| 2 | $P_2$ | Downhill Racing | $P_1$ | Skis | $P_3$ | Explanation |
| 3 | $P_1$ | Explanation | $P_3$ | Ski Boots | $P_2$ | Downhill Racing |
| 4 | $P_1$ | Skiing Wear Show | $P_2$ | Downhill Racing | $P_3$ | Skiing Wear Show |
| 5 | $P_1$ | Skiing Wear Show | $P_2$ | Downhill Racing | $P_3$ | Skiing Wear Show |

We have indicated in Table 2 examples of scenes reproduced on the three displays $D_1$–$D_3$ during each Step of the presentation program in Table 1. We have set forth the scenes in Table 2 on the assumption that this audiovisual presentation system 10 is being put to use for publicity by a skiing products manufacturer.

The columns designated "Source" under "Display $D_1$", "Display $D_2$" and "Display $D_3$" in Table 2 represent source commands indicative of the sources (i.e. disk players $P_1$–$P_3$) of the scenes being reproduced on the respective displays. The source commands may be understood to indicate desired connections between disk players $P_1$–$P_3$ and displays $D_1$–$D_3$ in each step of the presentation program, since each of the disk players $P_1$–$P_2$ is connectable to any of the displays by the switching system 12. Thus, in Step No. 2, for example, the display $D_1$ is reproducing a scene from the player $P_2$, the display $D_2$ a scene from the player $P_1$, and the display $D_3$ a scene from the player $P_3$.

The source commands may be advantageously included in the presentation program and written on the memory 22 in the case where the switching system 12 is employed as in the present embodiment. Reading out the source commands along with the playback commands and the associated address designations in each step of the presentation program, the system controller 18 actuates the switching system 12 as dictated by the source commands.

We will now explain the presentation program and the resulting reproduction of exemplified scenes in Tables 1 and 2 in more detail. First of all, in Step No. 0, the system controller 18 will read out the playback command BA and address designation 100 for the first disk player $P_1$, the playback command BA and address designation 30,000 for the second disk player $P_2$, and the playback command BA and address designation 1000 for the third disk player $P_3$, as set forth in Table 1. Thereupon the system controller 18 will deliver to the disk players $P_1$–$P_3$ the control signals that have been prepared in response to the playback commands and associated address designations.

Inputting these control signals, the disk players $P_1$–$P_3$ will search for Address 100, Address 30,000 and Address 1000 on the video disks $V_1$–$V_3$, respectively. We understand that the disk players $P_1$–$P_3$ are conventionally constructed for high speed search. Therefore, readily finding these addresses, the disk players $P_1$–$P_3$ will start scanning the designated tracks.

Also, in Step No. 0, the system controller 18 will read out the source commands indicated in Table 2. The source commands in this case are the first disk player $P_1$ for the first display $D_1$, the second disk player $P_2$ for the second display $D_2$, and the third disk player $P_3$ for the third display $D_3$. Thus the system controller 18 will cause the switching system 12 to connect the first disk player $P_1$ to the first display $D_1$, the second disk player $P_2$ to the second display $D_2$, and the third disk player $P_3$ to the third display $D_3$.

Table 2 indicates that in Step No. 0, the three displays $D_1$–$D_3$ reproduce in combination a panoramic view of Mr. Matterhorn from Address 100 on the first video disk $V_1$, Address 30,000 on the second video disk $V_2$, and Address 100 on the third video disk $V_3$. The view will be displayed ten seconds in still.

Then, upon lapse of ten seconds following the start of Step No. 0, the system controller 18 will know the commencement of Step No. 1 by the Step No. signal from the unshown decoder. Thereupon the system controller 18 will read out the playback command BA and address designation 200 for the first disk player $P_1$, the playback command NF and address designation 42,000 for the second disk player $P_2$, and the playback command BA and address designation 2000 for the third disk player $P_3$, as set forth in Table 1. Reading these playback commands and address designations, the system controller 18 will deliver corresponding control signals to the disk players $P_1$–$P_3$. These disk players will then respond as follows to the control signals.

The first disk player $P_1$ will search for Address 200 on the first video disk $V_1$ at high speed and scan this track. The second disk player $P_2$ will scan Addresses 30,001–42,000 on the second video disk $V_2$ in the normal forward mode. The third disk player $P_3$ will search for Address 2000 on the third video disk $V_3$ at high speed and scan this track.

Also, in Step No. 1, the system controller 18 will read out the source commands given in Table 2. The source commands for Step No. 1 are the same as for Step No. 0. Therefore, the switching system 12 will hold the first disk player $P_1$ connected to the first display $D_1$, the second disk player $P_2$ connected to the second display $D_2$, and the third disk player $P_3$ connected to the third display $D_3$.

Thus, as indicated also in Table 2, the first display $D_1$ will reproduce an image of skis in still from Address 200 on the first video disk $V_1$. The second display $D_2$ will reproduce a downhill racing scene in continuous motion from Addresses 30,001–42,000 on the second video disk $V_2$. The third display $D_3$ will reproduce an image of ski boots in still from Address 2000 on the third video disk $V_3$.

The system controller 18 will proceed to Step No. 2 upon lapse of thirty seconds following the start of Step No. 1, reading out the playback command SF for only the third disk player $P_3$. The third disk player $P_3$ will then step forward from Address 2000 to Address 2001 on the third video disk $V_3$ and scan this latter track. The first and second disk players $P_1$ and $P_2$ will continue the states commanded in Step No. 1. The source commands for Step No. 2 are the second disk player $P_2$ for the first display $D_1$, the first disk player $P_1$ for the second display $D_2$, and the third disk player $P_3$ for the third display $D_3$.

As will be noted from Table 2, therefore, the first display $D_1$ will reproduce motion a continuation of the downhill racing scene, which was shown on the second display $D_2$ in Step No. 1, in continuous motion from Addresses 30,001–42,000 on the second video disk $V_2$. The second display $D_2$ will reproduce the skis scene, which has been reproduced on the first display $D_1$ in Step No. 1, in still from Address 200 on the first video disk $V_1$. The third display $D_3$ will reproduce a scene explanatory of the skis scene on the second display $D_2$ in still from Address 2001 on the third video disk $V_3$.

In Step No. 3, which comes thirty seconds after the start of Step No. 2, the system controller 18 will read out the playback command SF for the first disk player $P_1$ and the playback command BA and address designation 2000 for the third disk player $P_3$. The first disk player $P_1$ will then step forward from Address 200 to Address 201 on the first video disk $V_1$ and scan this later track. The third disk player $P_3$ will search for Address 2000 on the third video disk $V_3$ and scan this track again. The second disk player $P_2$ will continue the scanning of Addresses 30,001–42,000 on the second video disk $V_2$. The source commands for Step No. 3 are the first disk player $P_1$ for the first display $D_1$, the third disk player $P_3$ for the second display $D_2$, and the second disk player $P_2$ for the third display $D_3$.

Thus, as indicated in Table 2, the display $D_1$ will reproduce a scene explanatory of the ski boots scene on the second display $D_2$ in still from Address 201 on the first video disk $V_1$. The ski boots scene on the second display $D_2$, which was also reproduced on the third display $D_3$ in Step No. 1, is from Address 2000 on the third video disk $V_3$. The third display $D_3$ will reproduce a continuation of the downhill racing scene in continuous motion from Addresses 30,001–42,000 on the second video disk $V_2$.

Upon lapse of thirty seconds following the start of Step No. 3, the system controller 18 will proceed to Step No. 4, reading out the playback command BA and address designation 1000 for the first disk player $P_1$ and the playback command BA and address designation 3000 for the third disk player $P_3$. The first and the third disk players $P_1$ and $P_3$ will then search for Addresses 1000 and 3000 on the first third video disks $V_1$ and $V_3$, respectively, at high speed and scan these tracks. The second disk player $P_2$ will continue the scanning of Addresses 30,001–42,000 on the second video disk $V_2$. The source commands for Step No. 4 are the first disk player $P_1$ for the first display $D_1$, the second disk player $P_2$ for the second display $D_2$, and the third disk player $P_3$ for the third display $D_3$.

In Step No. 4, the first display $D_1$ will reproduce a starting title scene of a men's skiing wear show in still from Address 1000 on the first video disk $V_1$. The second display $D_2$ will reproduce a continuation of the downhill racing scene in continuous motion from Addresses 30,001–42,000 on the second video disk $V_2$. The third display $D_3$ will reproduce a starting title scene of a women's skiing wear show in still from Address 3000 on the third video disk $V_3$.

Step No. 5 will start ten seconds after the start of Step No. 4. The system controller 18 in this step will read out the playback command NF and address designation 10,000 for the first disk player $P_1$ and the playback command NF and address designation 12,000 for the third disk player $P_3$. The first disk player $P_1$ will then start scanning Addresses 1001–10,000 on the first video disk $V_1$ in the normal forward mode. The third disk player $P_3$ will start scanning Addresses 3001–12,000 on the third video disk $V_3$ in the normal forward mode. The second disk player $P_2$ will continue the scanning of Addresses 30,001–42,000 on the second video disk $V_2$. The source commands for Step No. 5 are the same as those for Step No. 4.

Accordingly, in Step No. 5, the first display $D_1$ will reproduce the men's skiing wear show, which follows the title scene on the first display $D_1$ in Step No. 4, in continuous motion from Addresses 1001–10,000 on the first video disk $V_1$. The second display $D_2$ will reproduce a continuation of the downhill racing scene in continuous motion from Addresses 30,001–42,000 on the second video disk $V_2$. The third display $D_3$ will reproduce the women's skiing wear show, which follows the title scene on the third display $D_3$ in Step No. 4, in continuous motion from Addresses 3001–12,000 on the third video disk $V_3$.

The presentation program for the publicity of skiing products will continue in a like manner with the subsequent steps, to an extent permitted by the capacities of the video disks $V_1$–$V_3$. We believe, however, that we have already explained the presentation program insofar as is necessary for a full understanding of our invention.

Second Form

Figure 2:
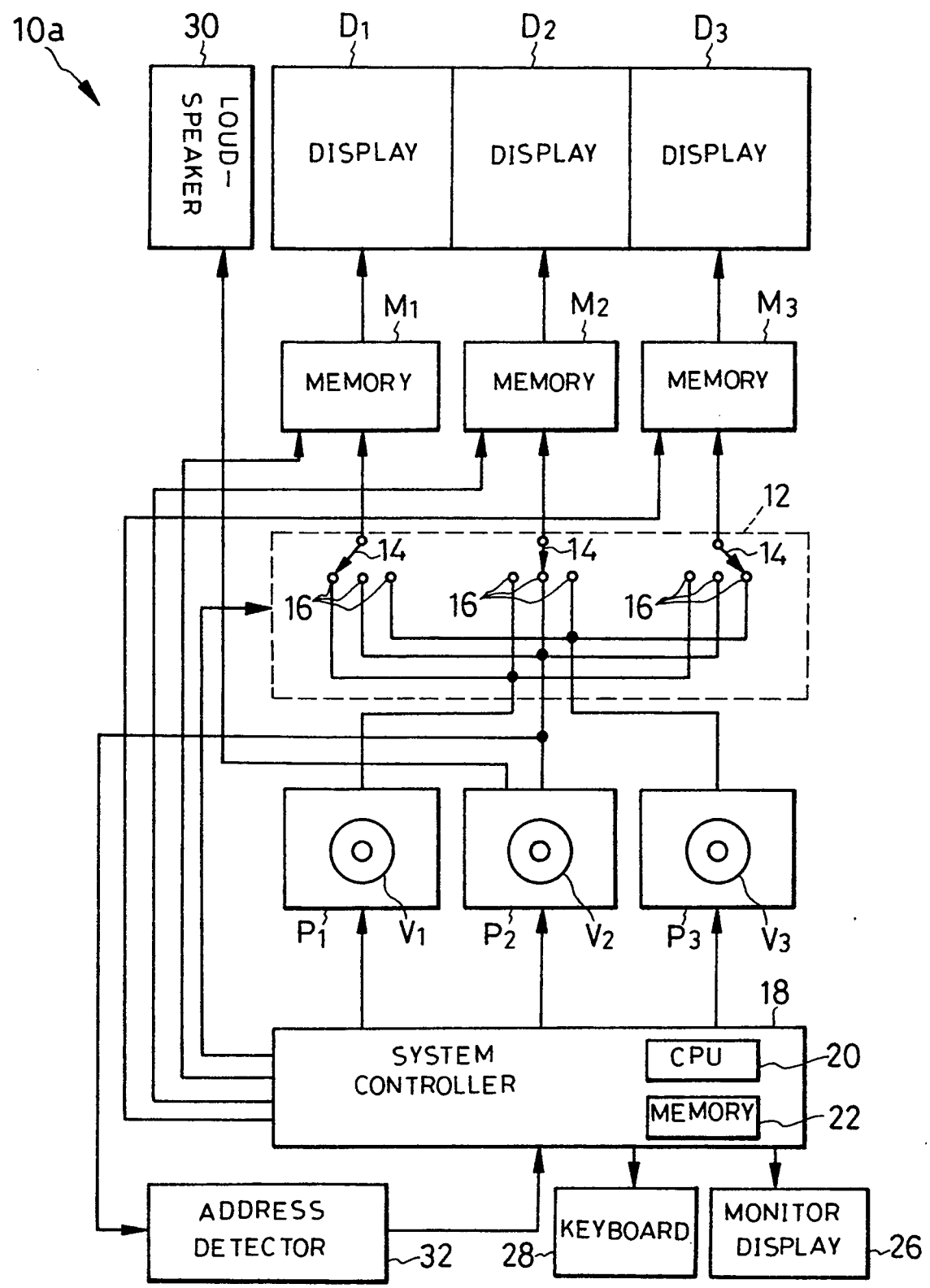
FIG. 2 is a block diagram of an alternative audiovisual presentation system constructed in accordance with our invention.

We have illustrated in FIG. 2 an alternate audiovisual presentation system 10a according to our invention. This alternate system 10a features an address detector circuit 32 connected between the second video disk player $P_2$ and the system controller 18. The alternate presentation system 10a is similar in the other details of construction to the FIG. 1 system 10 except that the system controller of the alternate system need not incorporate a timer. In FIG. 2, therefore, we have identified the various parts of the alternate system 10a by the same reference characters as used to denote the corresponding parts of the first disclosed system 10. No more repeated description of the construction of the alternate system 10a is considered necessary.

In this alternate presentation system 10a, however, it is essential that all the record tracks on the second video disk $V_2$ be scanned sequentially for continuous reproduction of all the prerecorded scenes thereon. Also, this second video disk $V_2$ must be put to use exclusively with the second disk player $P_2$ to which the address detector circuit 32 is connected.

Thus, as the second disk player $P_2$ sequentially scans all the record tracks on the video disk $V_2$, the address detector circuit 32 derives the addresses of the successive record tracks from the output from the second disk player. The system controller 18 utilizes these addresses for the determination of the successive steps of the presentation program.

Operation of Second Form

The operation of the alternate presentation system 10a will be best understood by referring to Table 3 setting forth an example of presentation program suitable for use with this system. This presentation program is to be written on the rewritable memory 22 in the system controller 18.

TABLE 3

| Step No. | Address on Disk $V_2$ | Alternate Presentation Program | | | | | |
|---|---|---|---|---|---|---|---|
| | | Player $P_1$ | | Player $P_2$ | | Player $P_3$ | |
| | | Command | Address | Command | Address | Command | Address |
| 0 | 0 | BA | 100 | NF | 42000 | BA | 1000 |
| 1 | 303 | BA | 200 | | | BA | 2000 |
| 2 | 1212 | | | | | SF | |
| 3 | 2121 | SF | | | | BA | 2000 |
| 4 | 3030 | BA | 1000 | | | BA | 3000 |
| 5 | 3333 | NF | 10000 | | | NF | 12000 |

The presentation program of Table 3 is essentially equivalent to that of Table 1 except that the addresses being retrieved sequentially from the successive record tracks of the video disk $V_2$ are relied upon for commencing the successive steps of the presentation program. Initially, therefore, the second disk player $P_2$ must be commanded to scan sequentially all the record tracks, addresses 0-42,000, on the video disk $V_2$ for continuous retrieval of all the prerecorded scenes thereon.

Approximately ten seconds after the start of Step No. 0, the address detector circuit 32 will put out a signal representative of Address 303 on the video disk $V_2$ being scanned by the second disk player $P_2$. The system controller 18 will proceed to Step No. 1 in response to this output from the address detector circuit 32, reading out the playback command BA and address designation 200 for the first disk player $P_1$ and the playback command BA and address designation 2000 for the third disk player $P_3$.

Then, approximately thirty seconds after the start of Step No. 1, the address detector circuit 32 will put out a signal indicative of Address 1212 on the video disk $V_2$. The system controller 18 will respond to this output from the address detector circuit by proceeding to Step No. 2, reading out the playback command SF for the third disk player $P_3$. The presentation program will progress in a like manner through the subsequent steps, with each step triggered off by one of the preselected addresses on the video disk $V_2$ derived from the output from the second disk player $P_2$.

The presentation program of Table 3 makes possible the reproduction on the displays $D_1$-$D_3$ of the same scenes as those represented in Table 2 by way of example. However, according to this alternate presentation program, a slight change in the recordings on the video disk $V_2$ is necessary for the reproduction of the same scenes as in Table 2 because all the record tracks on the video disk $V_2$ must be scanned sequentially and without interruption. The required change concerns the panorama of Mr. Matterhorn reproduced in still on all the displays $D_1$-$D_3$ in Step No. 0. For such still image reproduction, the video disk $V_2$ may have the same image prerecorded on Addresses 0-303 thereon, instead of on only one record track as in Table 1.

It is, of course, understood that our invention is not to be limited by the exact details of the representative presentation systems and presentation programs set forth above. A variety of departures from the foregoing disclosure may be made in order to conform to design preferences or to the requirements of each specific application of our invention. It is therefore appropriate that our invention be construed broadly and in a manner consistent with the fair meaning or proper scope of the claims which follow.

What we claim is:

1. A visual presentation system capable of visually presenting successive sets of correlated scenes according to a desired presentation program, said correlated scenes being recorded on a plurality of record media, comprising:
   (a) a plurality of playback devices associated one with each record medium for retrieving prerecorded scenes therefrom, each record medium having a multiplicity of record tracks on which the correlated scenes are prerecorded along with addresses individually identifying the record tracks;
   (b) a plurality of displays connected to the playback devices for jointly reproducing successive sets of the prerecorded scenes retrieved from the plurality of record media by the playback devices, the plural displays being disposed in juxtaposition; and
   (c) a system controller connected to the playback devices and having a memory for storing a presentation program, the presentation program including the addresses of desired record tracks on each record medium from which the prerecorded scenes are to be retrieved by one associated device in a desired sequence, the system controller reading the presentation program on the memory for controlling the playback devices according to the presentation program so as to cause each playback device to retrieve the prerecorded scenes from the desired record tracks on one associated record medium in the desired sequence;
   wherein the presentation program has a series of steps, each step representing addresses and playback commands for one set of correlated scenes jointly reproduced on the displays, wherein the presentation program written on the memory includes data representing moments of time when the successive steps of the presentation program are to be started, and wherein the visual presentation system further comprises a timer connected to the system controller for providing a time signal, the system controller including means responsive to the time signal to read the successive steps of the presentation program on the memory at the moments of time specified by the presentation program; and further comprising: switching means for connecting each playback device to any of the displays; a monitor display connected to the system controller for visually reproducing the presentation program on the memory; and input means connected to the system controller for rewriting the presentation program on the memory.

2. A visual presentation system capable of visually presenting successive sets of correlated scenes according to a desired presentation program, said correlated scenes being recorded on a plurality of record media, comprising:

(a) a plurality of playback devices associated one with each record medium for retrieving prerecorded scenes therefrom, each record medium having a multiplicity of record tracks on which the correlated scenes are prerecorded along with addresses individually identifying the record tracks;

(b) a plurality of displays connected to the playback devices for jointly reproducing successive sets of the prerecorded scenes retrieved from the plurality of record media by the playback devices, the plural displays being disposed in juxtaposition; and (c) a system controller connected to the playback devices and having a memory for storing a presentation program, the presentation program including the addresses of desired record tracks on each record medium from which the prerecorded scenes are to be retrieved by one associated playback device in a desired sequence, the system controller reading the presentation program on the memory for controlling the playback devices according to the presentation program so as to cause each playback device to retrieve the prerecorded scenes from the desired record tracks on one associated record medium in the desired sequence;

wherein the presentation program has a series of steps each representing one set of correlated scenes jointly reproduced on the displays, wherein the record media include a preselected record medium from which all the prerecorded scenes are to be retrieved continuously in the order of the successive record tracks thereon for continuous reproduction, wherein the presentation program written on the memory includes the addresses of preselected record tracks on the preselected record medium where the successive steps of the presentation program are to be started, and wherein the visual presentation system further comprises an address detector circuit connected to one playback device associated with the preselected record medium for detecting the address of the successive record tracks on the preselected record medium from which the prerecorded scenes are being retrieved, the system controller being connected to the address detector circuit for reading the successive steps of the presentation program on the memory on the basis of the detected addresses of the record tracks on the preselected record medium; and further comprising: switching means for connecting each playback device to any of the displays; a monitor display connected to the system controller for visually reproducing the presentation program on the memory; and input means connected to the system controller for rewriting the presentation program on the memory.

3. A visual presentation system capable of visually presenting, either in still or in continuous motion, successive sets of correlated scenes according to a desired presentation program, said correlated scenes being recorded on a plurality of record media, comprising:

(a) a plurality of playback devices associated one with each record medium for retrieving prerecorded scenes therefrom, each record medium having a multiplicity of record tracks on which the correlated scenes are prerecorded along with addresses individually identifying the record tracks;

(b) a plurality of displays connected to the playback devices for jointly reproducing, either in still or in continuous motion, successive sets of the prerecorded scenes retrieved from the plurality of record media by the playback devices, the plural displays disposed in juxtaposition; and (c) a system controller connected to the playback devices and having a memory for storing a presentation program, the presentation program including the addresses of desired record tracks on each record medium from which the prerecorded scenes are to be retrieved by one associated playback device in a desired sequence, and playback commands indicative of whether the prerecorded scenes on the desired record tracks are to be reproduced in still or in continuous motion, the system controller reading the presentation program on the memory for controlling the playback devices according to the presentation program so as to cause each playback device to retrieve the prerecorded scenes from the desired record tracks on one associated record medium in the desired sequence, for reproduction on one of the displays either in still or in continuous motion as dictated by the presentation program;

wherein the presentation program has a series of steps, each step representing addresses and playback commands for one set of correlated scenes jointly reproduced on the displays, wherein the presentation program written on the memory includes data representing moments of time when the successive steps of the presentation program are to be started, and wherein the visual presentation system further comprises a timer connected to the system controller for providing a time signal, the system controller including means responsive to the time signal to read the successive steps of the presentation program on the memory at the moments of time specified by the presentation program; and further comprising: switching means for connecting each playback device to any of the displays; a monitor display connected to the system controller for visually reproducing the presentation program on the memory; and input means connected to the system controller for rewriting the presentation program on the memory.

4. A visual presentation system capable of visually presenting, either in still or in continuous motion, successive sets of correlated scenes according to a desired presentation program, said correlated scenes being recorded on a plurality of record media, comprising:

(a) a plurality of playback devices associated one with each record medium for retrieving prerecorded scenes therefrom, each record medium having a multiplicity of record tracks on which the correlated scenes are prerecorded along with addresses individually identifying the record tracks;

(b) a plurality of displays connected to the playback devices for jointly reproducing, either in still or in continuous motion, successive sets of the prerecorded scenes retrieved from the plurality of record media by the playback devices, the plural displays disposed in juxtaposition; and (c) a system controller connected to the playback devices and having a memory for storing a presentation program, the presentation program including the addresses of desired record tracks on each record medium from which the prerecorded scenes are to be retrieved by one associated playback device in a desired sequence, and playback commands indicative of whether the prerecorded scenes on the desired record tracks are to be reproduced in still or in continuous motion, the system controller reading the presentation program on the memory for controlling the playback devices according to cause each playback device to retrieve the prerecorded scenes from the desired record tracks on one associated record medium in the desired sequence, for reproduction on one of the displays either in still or in continuous motion as dictated by the presentation program; wherein the presentation program has a series of steps each representing one set of correlated scenes jointly reproduced on the displays, wherein the record media include a preselected record medium from which all the prerecorded scenes are to be retrieved continuously in the order of the successive record tracks thereon for continuous reproduction, wherein the presentation program written on the memory includes the addresses of preselected record tracks on the preselected record medium where the successive steps of the presentation program are to be started, and wherein the visual presentation system further comprises an address detector circuit connected to one playback device associated with the preselected record medium for detecting the addresses of the successive record tracks on the preselected record medium from which the prerecorded scenes are being retrieved, the system controller being connected to the address detector circuit for reading the successive steps of the presentation program on the memory on the basis of the detected addresses of the record tracks on the preselected record medium; and further comprising: switching means for connecting each playback device to any of the displays; a monitor display connected to the system controller for visually reproducing the presentation program on the memory; and input means connected to the system controller for rewriting the presentation program on the memory.

5. The visual presentation system of any one of claims 1–4 wherein the presentation program has a series of steps each representing one set of correlated scenes jointly reproduced on the displays, wherein the presentation program written on the memory includes source commands indicative of desired connections to be established by the switching means between the playback devices and the displays in each step of the presentation program, and wherein the system controller is connected to the switching means for controlling connections between the playback devices and the displays according to the source commands of the presentation program.

* * * * *